Figure 1:
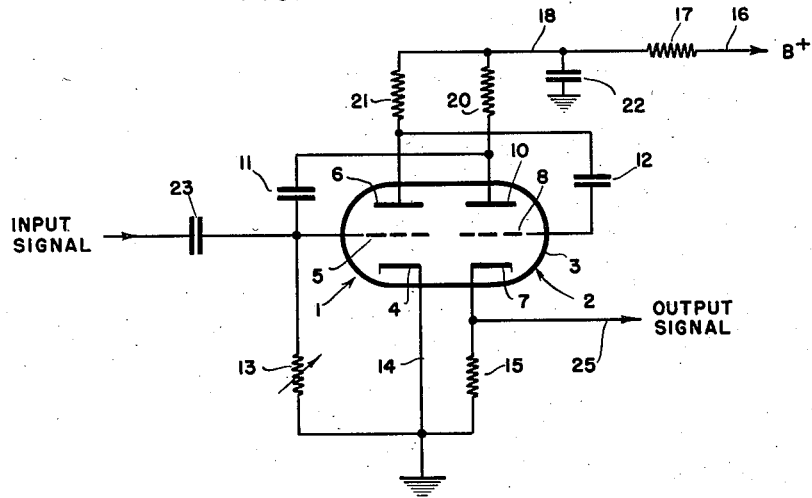

Jan. 18, 1949.　　　J. D. SCHANTZ　　　2,459,723

PULSE AND SQUARE WAVE GENERATOR

Filed Aug. 26, 1944

INVENTOR
JOSEPH D. SCHANTZ

BY

ATTORNEY

Patented Jan. 18, 1949

2,459,723

UNITED STATES PATENT OFFICE 2,459,723

PULSE AND SQUARE WAVE GENERATOR

Joseph D. Schantz, Fort Wayne, Ind., assignor, by mesne assignments, to Farnsworth Research Corporation, a corporation of Indiana Application August 26, 1944, Serial No. 551,320

13 Claims. (Cl. 250—36)

This invention relates to square wave generators and particularly to pulse and square wave generators utilizing a multivibrator circuit.

A multivibrator is an oscillator comprising two thermionic tubes having their plates cross-connected by condensers to their grids. In other words, the plate of each tube is capacity coupled to the grid of the other tube. A multivibrator can be arranged to oscillate at a natural frequency which is determined by the value of the coupling condensers and their grid leak resistors through which the condensers discharge. However, a multivibrator can also be arranged so that it is not self-oscillating and requires driving impulses from an external source which determine the frequency of the output signal.

Multivibrators have been used in the past for generating square waves which find wide application in the television and related fields. They are used, for instance, for deriving square wave voltages which may be employed for timing the scanning beams of television pickup and receiving tubes.

The demands made with regard to the constancy and stability of the current or the voltage wave shape are extremely severe particularly where the square wave is used for timing the line scanning of a television pickup or receiving tube. Prior multivibrator circuits devised for this purpose do not generate a square wave form having sufficiently steep leading and trailing edges to satisfy these demands. Consequently prior art generators require additional circuit means to provide the desired wave shape.

It is an object of the present invention, therefore, to provide a novel multivibrator circuit for generating square wave impulses having steeper leading and trailing edges than obtainable heretofore.

Another object of this invention is to provide a self-oscillating multivibrator circuit for generating an output signal at a harmonic of the frequency of the driving or synchronizing input pulses.

In accordance with the present invention there is provided a square wave generator comprising a multivibrator including two electric discharge tubes each having a cathode, a grid and an anode. Condensers are provided for coupling the anode of each tube to the grid of the other tube, and a potential is supplied to the anodes of the two tubes that is positive with respect to ground. The grid of the first tube is connected to ground through a grid leak resistor, and the cathode of the second tube is connected to ground through another resistor. Hence, the first tube circuit has a predetermined time constant which is determined by the condenser coupling its grid to the anode of the second tube and by its grid leak resistor. The second tube does not have a grid leak resistor and, therefore, the external circuit connected to the grid of the second tube has an infinite time constant. This multivibrator is not self-oscillating and must be driven from a foreign source. To this end means are provided for supplying an input signal to the multivibrator and for deriving a square wave output signal from the second tube.

In accordance with another embodiment of the invention there is provided a resistor for connecting the cathode of the first tube to ground. By means of this cathode resistor the multivibrator is made self-oscillating while the input signal insures synchronization of the oscillations. The output signal is, therefore, obtained at a harmonic of the fundamental frequency of the input signal.

For a better understanding of the invention, together with other and further objects thereof, reference is made to the following description, taken in connection with the accompanying drawing, and its scope will be pointed out in the appended claims.

Figure 2:
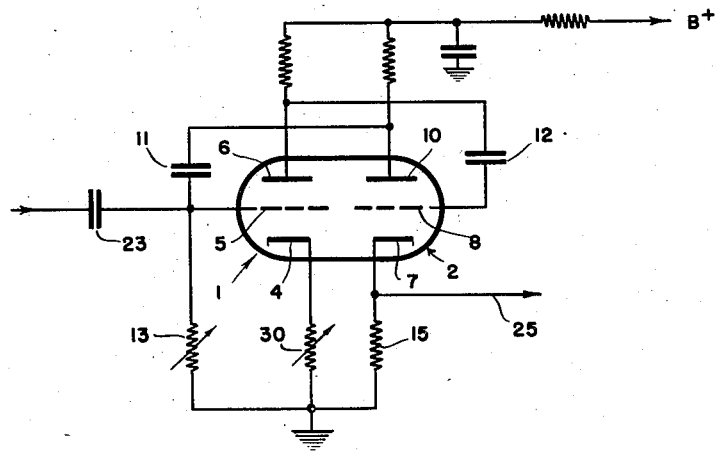

In the accompanying drawing, Fig. 1 is a schematic diagram of a multivibrator in accordance with the invention arranged for generating sharp square wave impulses, while Fig. 2 is a schematic circuit diagram of a modified form of multivibrator arranged for generating square wave impulses at a multiplied frequency.

Referring now more particularly to Fig. 1, there is provided a multivibrator comprising two thermionic tubes 1 and 2. The thermionic tubes 1 and 2 are enclosed in a common envelope 3 in the manner of a duplex triode. The tube 1 includes a cathode 4, a grid 5 and an anode 6, while the tube 2 is provided with a cathode 7, a grid 8 and an anode 10. The anode 10 of the tube 2 is connected to the grid 5 of the tube 1 through a coupling condenser 11. Similarly, the anode 6 of the tube 1 is connected to the grid 8 of the tube 2 through a coupling condenser 12. A variable grid leak resistor 13 connects the grid 5 to ground. The cathode 4 is connected to ground through a lead 14 and the cathode 7 is connected to ground through a cathode resistor 15.

The anodes 6 and 10 are supplied with a potential from the positive terminal of a battery connected to a lead 16 which is positive with respect to ground. A resistor 17 is arranged between the lead 16 and a lead 18 which in turn is connected through resistors 20 and 21, respectively, to the anodes 10 and 6. A blocking condenser 22 connected between the lead 18 and ground bypasses to ground alternating current which may be present in the lead 18.

The input signal is impressed on the grid 5 of the tube 1 through a coupling condenser 23. The output signal is developed across the cathode resistor 15 and may be obtained through the lead 25.

Referring now to the operation of the multivibrator illustrated in Fig. 1, assume the cycle of operation to start at the instant the tube 2 has just been rendered conducting. At this instant space current begins to flow from the positive pole of the battery through the space discharge path of the tube 2. This causes the potential of the anode 10 to be depressed by reason of the voltage drop across the anode resistor 20. The impression of the depressed anode potential by means of the coupling condenser 11 upon the control grid 5 of the tube 1 biases this tube beyond cutoff so that the conduction of space current therein is terminated. Accordingly, the tube 2 now conducts space current while the tube 1 is non-conducting.

The grid voltage of tube 2 in this state must be above cutoff value but be somewhat below cathode potential since if the grid becomes more positive than cathode it will immediately collect electrons which will reduce its voltage.

The charge of the coupling condenser 11 is gradually dissipated through the grid leak resistor 13, and thereby the control grid voltage of the tube 1 is gradually increased. Ultimately, this voltage reaches the space current cutoff value, and conduction again is initiated in the tube 1. Immediately the potential of the anode 6 is depressed by reason of the space current flow through the anode resistor 21. The impression of this depressed anode voltage by means of the coupling condenser 12 upon the control grid 8 of the tube 2 depresses in turn the control grid voltage of the tube 2 below its space current cutoff value. The termination of the space current in the tube 2 causes an increase of the potential of the anode 10 as there is no longer a voltage drop across the anode resistor 20. This, in turn, increases the potential of the control grid 5 of the tube 1 impressed through the coupling condenser 11, and thus the current flow in the tube 1 is increased still further. At this instant the tube 1 conducts space current while the tube 2 is non-conducting.

However, in contradistinction to the typical multivibrator operating cycle the negative voltage impressed upon the grid 8 of the tube 2 can not be removed in view of the fact that the grid 8 does not have a grid leak resistor. Accordingly, some outside control must be introduced for terminating the space current flowing in the tube 1. In accordance with the present invention this is effected through the condenser 23. The signal impressed upon the grid 5 preferably includes negative impulses recurring at the fundamental frequency of the input signal. At this point of the operating cycle a negative impulse of the input signal is now impressed upon the grid 5, biasing it beyond cutoff so that the conduction of space current in the tube 1 is terminated. This causes an increase of the potential of the anode 6 which removes through the coupling condenser 12 the charge on grid 8. In this way space current begins again to flow through the tube 2.

The time constant of the external grid circuits of the tube 1 is determined by the values of the coupling condenser 11 and the grid leak resistor 13 which, as shown in the drawing, is variable. On the other hand, the grid circuit of tube 2 has a substantially infinite time constant except when tube 2 is conducting and there is grid current flow therein because the grid 8 has no grid leak resistor and, accordingly, any charge impressed upon the coupling condenser 12 can not be dissipated to ground except only through tube 2. The value of the time constant of the tube 1 determines the point during the operating cycle of the multivibrator when the tube 1 begins to conduct space current again. The point when the conduction of space current in tube 1 is terminated, is determined by the arrival by the negative impulse of the input signal impressed upon the grid 5. Hence, for a given fundamental frequency of the input signal the value of the time constant of the tube 1 determines the length of time during each operating cycle during which the tube 1 does not conduct space current. On the other hand, as explained previously, the tube 2 conducts space current substantially during those periods when the tube 1 is rendered non-conducting and vice-versa. By adjusting the variable grid leak resistor 13 the time constant of the first tube can be varied. This in turn changes the length of time in each operating cycle during which the tube 1 does not conduct space current and, therefore, also controls the length of time during which the tube 2 conducts space current. Thus, the width of the output pulses which are derived from the tube 2 can be adjusted by means of the variable grid leak resistor 13.

The output signal is developed across the cathode resistor 15, and the output signal may be obtained from the lead 25. Analysis of this output signal proves it to be a sharper square wave form than any obtained heretofore. The grid current as well as the anode current of the tube 2 flows through the cathode resistor 15 which may account for the sharper square wave form obtained with the multivibrator illustrated in Fig. 1.

While it will be understood that the circuit specifications of the multivibrator shown in Fig. 1 may vary according to the design of any particular application, the following circuit specifications for a multivibrator are included, by way of example only, suitable for a pulse frequency of the order of 40 kilocycles and using a duplex triode of the 6F8G type:

| | |
|---|---|
| Amplitude of the negative driving pulses | 60 volts |
| Positive potential of the battery | 250 to 300 volts |
| Condenser 12 | .002 microfarad |
| Condenser 11 | 100 micro-microfarads |
| Condenser 22 | .25 microfarad |
| Condenser 23 | 50 micro-microfarads |
| Resistor 15 | 1,000 ohms |
| Resistor 20 | 10,000 ohms |
| Resistor 21 | 1,000 ohms |
| Resistor 17 | 10,000 ohms |
| Variable resistor 13 | 100,000 ohms |

Referring now to Fig. 2, in which like components are designated by the same reference numerals as were used in Fig. 1, it will be seen that the multivibrator circuit is substantially identical with the one shown in Fig. 1. Fig. 2 differs from Fig. 1 only by a variable cathode resistor 30 arranged between the cathode 4 and ground. It has been found experimentally that the variable cathode resistor 30 makes the multivibrator circuit of Fig. 2 self-oscillating.

The frequency of self-oscillation has been found to depend on the value of resistor 30. As is well known such a free running oscillator can be synchronized by pulses occurring at approximately the free running frequency or a sub-multiple thereof. These synchronizing signals are impressed through condenser 23 and an output signal is obtained through lead 25 at a harmonic of the fundamental frequency of the input signal impressed upon the grid 5 through the condenser 23.

The output signal obtained through the lead 25, however, does not have the same sharp square wave form as the output signal generated by the multivibrator circuit of Fig. 1.

By using the same specifications, as given by way of example in connection with Fig. 1, the multivibrator illustrated in Fig. 2 can be made to operate satisfactorily. The resistor 30 should be variable between about 5,000 to 10,000 ohms.

While there has been described what are at present considered the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A square wave generator comprising a multivibrator including a first electric discharge device and a second electric discharge device, each having a cathode, a grid and an anode, condensers for coupling the anode of each of said devices to the grid of the other device, means for supplying a potential to said anodes that is positive with respect to ground, a grid leak resistor for connecting the grid of said first device to ground, another resistor for connecting the cathode of said second device to ground, said first device having a predetermined time constant determined by the condenser coupling the grid of said first device to the anode of said second device and said grid leak resistor, the grid of said second device being externally insulated from its cathode so that the coupling circuit of said second device has a nominally infinite time constant, means for supplying an input signal to said multivibrator, and an output circuit coupled to said second device.

2. A square wave generator comprising a multivibrator including a first electric discharge device and a second electric discharge device, each having a cathode, a gride and an anode, condensers for coupling the anode of each of said devices to the grid of the other device, resistors connected to said anodes, means for supplying through said resistors a potential to said anodes that is positive with respect to ground, a grid leak resistor for connecting the grid of said first device to ground, the cathode of said first device being connected to ground, another resistor for connecting the cathode of said second device to ground, said first device having a predetermined time constant determined by the condenser coupling the grid of said first device to the anode of said second device and said grid leak resistor, the grid of said second device being externally insulated from its cathode so that the coupling circuit of said second device has a nominally infinite time constant, means for supplying a negative impulse input signal to said first device, and an output circuit coupled to said second device.

3. A square wave generator comprising a multivibrator including a first thermionic tube and a second thermionic tube, each having a cathode, a grid and an anode, condensers for coupling the anode of each of said tubes to the grid of the other tube, resistors connected to said anodes, means for supplying through said resistors a potential to said anodes that is positive with respect to ground, a variable grid leak resistor for connecting the grid of said first tube to ground, the cathode of said first tube being connected to ground, another resistor for connecting the cathode of said second tube to ground, said first tube having a predetermined time constant determined by the condenser coupling the grid of said first tube to the anode of said second tube and said variable grid leak resistor, the grid of said second tube being externally insulated from its cathode so that the coupling circuit of said second device has a nominally infinite time constant, means for supplying a negative impulse input signal to the grid of said first tube, and an output circuit connected across the cathode resistor of said second tube.

4. A square wave generator comprising a multivibrator including a first thermionic tube and a second thermionic tube, each having a cathode, a grid and an anode, condensers for coupling the anode of each of said tubes to the grid of the other tube, resistors connected to said anodes, means for supplying through said resistors a potential to said anodes that is positive with respect to ground, a variable grid leak resistor for connecting the grid of said first tube to ground, the cathode of said first tube being connected to ground, another resistor for connecting the cathode of said second tube to ground, said first tube having a predetermined time constant determined by the condenser coupling the grid of said first tube to the anode of said second tube and said variable grid leak resistor, the grid of said second tube being externally insulated from its cathode so that the coupling circuit of said second device has a nominally infinite time constant, means for supplying a negative impulse input signal recurring at a fundamental frequency to the grid of said first tube to control the termination of the current conducting period of said first tube, and an output circuit connected across the cathode resistor of said second tube for deriving a square wave output signal at said fundamental frequency, said variable grid leak resistor controlling the duration of the current conducting period of said second tube and thereby the width of said square wave output signal.

5. A square wave generator comprising a multivibrator including a first electric discharge device and a second electric discharge device, each having a cathode, a grid and an anode, condensers for coupling the anode of each of said devices to the grid of the other device, means for supplying a potential to said anodes that is positive with respect to ground, a grid leak resistor for connecting the grid of said first device to ground, resistors for connecting each of said cathodes individually to ground, said first device having a predetermined time constant determined by the condenser coupling the grid of said first device to the anode of said second device and said grid leak resistor, the grid of said second device being externally insulated from its cathode so that the coupling circuit of said second device has a nominally infinite time constant, means for supplying an input signal recurring at a fundamental frequency to said first device, and an output circuit coupled to said second device for deriving a square wave output signal at a harmonic of said fundamental frequency.

6. A square wave generator comprising a multivibrator including a first thermionic tube and a second thermionic tube, each having a cathode, a grid and an anode, condensers for coupling the anode of each of said tubes to the grid of the other tube, resistors connected to said anodes, means for supplying through said resistors a potential to said anodes that is positive with respect to ground, a grid leak resistor for connecting the grid of said first tube to ground, resistors for connecting each of said cathodes individually to ground, said first tube having a predetermined time constant determined by the condenser coupling the grid of said first tube to the anode of said second tube and said grid leak resistor, the grid of said second tube being externally insulated from its cathode so that the coupling circuit of said second device has a nominally infinite time constant, means for supplying an input signal recurring at a fundamental frequency to said first tube, and an output circuit connected across the cathode resistor of said second tube for deriving a square wave output signal at a harmonic of said fundamental frequency.

7. A square wave generator comprising a multivibrator including a first thermionic tube and a second thermionic tube, each having a cathode, a grid and an anode, condensers for coupling the anode of each of said tubes to the grid of the other tube, resistors connected to said anodes, means for supplying through said resistors a potential to said anodes that is positive with respect to ground, a grid leak resistor for connecting the grid of said first tube to ground, a resistor for connecting the cathode of said second tube to ground, an adjustable resistor for connecting the cathode of said first tube to ground, said first tube having a predetermined time constant determined by the condenser coupling the grid of said first tube to the anode of said second tube and said grid leak resistor, the grid of said second tube being externally insulated from its cathode so that the coupling circuit of said second device has a nominally infinite time constant, means for supplying an input signal receiving at a fundamental frequency to said first tube, and an output circuit connected across the cathode resistor of said second tube for deriving a square wave output signal at a harmonic of said fundamental frequency, the cathode resistor of said first tube controlling the termination of the current conducting period of said first tube and thereby the frequency of said output signal.

8. A square wave generator comprising a multivibrator including a first thermionic tube and a second thermionic tube, each having a cathode, a grid and an anode, condensers for coupling the anode of each of said tubes to the grid of the other tube, resistors connected to said anodes, means for supplying through said resistors a potential to said anodes that is positive with respect to ground, a grid leak resistor for connecting the grid of said first tube to ground, a resistor for connecting the cathode of said second tube to ground, an adjustable resistor for connecting the cathode of said first tube to ground, said first tube having a predetermined time constant determined by the condenser coupling the grid of said first tube to the anode of said second tube and said grid leak resistor, the grid of said second tube being externally insulated from its cathode so that the coupling circuit of said second device has a nominally infinite time constant, means for supplying an input signal recurring at a fundamental frequency to the grid of said first tube, and an output circuit connected across the cathode resistor of said second tube for deriving a square wave output signal at a harmonic of said fundamental frequency, said adjustable cathode resistor controlling the termination of the current conducting period of said first tube and thereby the frequency of said output signal.

9. A square wave generator comprising a multivibrator including a first thermionic tube and a second thermionic tube, each having a cathode, a grid and an anode, condensers for coupling the anode of each of said tubes to the grid of the other tube, resistors connected to said anodes, means for supplying through said resistors a potential to said anodes that is positive with respect to ground, an adjustable grid leak resistor for connecting the grid of said first tube to ground, a resistor for connecting the cathode of said second tube to ground, an adjustable resistor for connecting the cathode of said first tube to ground, said first tube having a predetermined time constant determined by the condenser coupling the grid of said first tube to the anode of said second tube and said adjustable grid leak resistor, the grid of said second tube being externally insulated from its cathode so that the coupling circuit of said second device has a nominally infinite time constant, means for supplying a negative impulse synchronizing input signal recurring at a fundamental frequency to the grid of said first tube to synchronize the cycle of current conducting periods of said tubes in accordance with said input signal, and an output circuit connected across the cathode resistor of said second tube for deriving a square wave output signal at a harmonic of said fundamental frequency, said adjustable cathode resistor controlling the termination of the current conducting period of said first tube and thereby the frequency of said output signal.

10. A square wave generator comprising a multivibrator including a first electric discharge device and a second electric discharge device, each of said devices having a cathode, a grid and an anode, means for supplying operating potentials to said cathodes and to said anodes, impedance means for coupling the anode of each of said devices to the grid of the other device, means coupled to said impedance means to impart to said first device a finite time constant, second impedance means coupled to said second device having a nominally infinite time constant, third impedance means coupled to said second device for deriving a square wave output signal from said second device, and means for supplying an input signal to said multivibrator.

11. A square wave generator comprising a multivibrator including a first electric discharge device and a second electric discharge device, each of said devices having a cathode, a grid and an anode, impedance means for coupling the anode of each of said devices to the grid of the other device, means for supplying a potential to said anodes that is positive with respect to ground, a grid leak resistor for connecting the grid of said first device to ground and cooperating with said impedance means to impart to said first device a finite time constant, means for completing the cathode circuit of said first device to ground, second impedance means coupled to said second device having a nominally infinite time constant, third impedance means for conductively connecting the cathode of said second device to ground, means for supplying an input signal to said multivibrator, and an output circuit coupled to said second device.

12. A square wave generator comprising a multivibrator including a first electric discharge device and a second electric discharge device, each of said devices having a cathode, a grid and an anode, condensers for coupling the anode of each of said devices to the grid of the other device, means for supplying a potential to said anodes that is positive with respect to ground, a grid leak resistor for connecting the grid of said first device to ground and cooperating with said condensers to impart to said first device a finite time constant, means for completing the cathode circuit of said first device to ground, impedance means coupled to said second device having a nominally infinite time constant, impedance means for conductively connecting the cathode of said second device to ground and deriving a square wave output signal from said second device, and means for supplying an input signal to said multivibrator.

13. A square wave generator comprising a multivibrator including a first electric discharge device and a second electric discharge device, each of said devices having a cathode, a grid and an anode, impedance means for coupling the anode of each of said devices to the grid of the other device, means for supplying a potential to said anodes that is positive with respect to ground, a grid leak resistor for connecting the grid of said first device to ground and cooperating with said impedance means to impart to said first device a finite time constant, means for completing the cathode circuit of said first device to ground, impedance means coupled to said second device having a nominally infinite time constant, a resistor for connecting the cathode of said second device to ground and deriving a square wave output signal from said second device, and means for supplying an input signal to said multivibrator.

JOSEPH D. SCHANTZ.

REFERENCES CITED

The following references are of record in the file of this patent:

UNITED STATES PATENTS

| Number | Name | Date |
| --- | --- | --- |
| 1,922,650 | Willoughby | Aug. 15, 1933 |
| 2,392,114 | Bartelink | Jan. 1, 1946 |
| 2,406,096 | Morrison | Aug. 20, 1946 |
| 2,416,201 | Nagel et al | Feb. 18, 1947 |